(12) United States Patent
Petrie et al.

(10) Patent No.: US 10,044,137 B2
(45) Date of Patent: Aug. 7, 2018

(54) BREAK-AWAY CABLE CONNECTOR

(76) Inventors: Gregory A. Petrie, San Dimas, CA (US); Steven P. Bishop, Thousand Oaks, CA (US); Davy Ta-Yuan Tong, Temple City, CA (US); Atulkumar M. Patel, Corona, CA (US)

( * ) Notice: Subject to any disclaimer, the term of this patent is extended or adjusted under 35 U.S.C. 154(b) by 584 days.

(21) Appl. No.: 13/573,307

(22) Filed: Sep. 7, 2012

(65) Prior Publication Data

US 2013/0187601 A1    Jul. 25, 2013

Related U.S. Application Data

(63) Continuation of application No. PCT/US2011/000433, filed on Mar. 8, 2011.

(Continued)

(51) Int. Cl.
*H01R 13/62* (2006.01)
*B60L 11/18* (2006.01)
(Continued)

(52) U.S. Cl.
CPC ........ *H01R 13/627* (2013.01); *B60L 11/1809* (2013.01); *B60L 11/1818* (2013.01); *H01R 13/635* (2013.01); *B60L 2270/32* (2013.01); *B60L 2270/34* (2013.01); *H01R 13/6276* (2013.01); *Y02T 10/7005* (2013.01); *Y02T 10/7072* (2013.01); *Y02T 90/14* (2013.01)

(58) Field of Classification Search
CPC .................... H01R 13/633; H01R 2201/26; H01R 13/187; H01R 13/6276; B60L 11/1818; B60L 2230/12; B60L 11/1824; Y10S 439/923; B60D 1/64

USPC ....... 439/923, 180, 606, 474, 502, 503, 505, 439/181, 860, 21, 578, 448, 320, 348, 34, 439/35, 154, 475; 174/73.1
See application file for complete search history.

(56) References Cited

U.S. PATENT DOCUMENTS 3,270,267 A    8/1966  Nolte, Jr.
3,777,050 A    12/1973 Silva
(Continued)

FOREIGN PATENT DOCUMENTS

CA    2129873 A1    3/1995
CN    101490904 A   7/2009
(Continued)

OTHER PUBLICATIONS

EPO, "Communication" dated Nov. 28, 2013, including a "Supplementary European Search Report" dated Nov. 19, 2013, for corresponding European Application No. EP 11753713.4.
(Continued)

*Primary Examiner* — Renee S Luebke
*Assistant Examiner* — Paul Baillargeon
(74) *Attorney, Agent, or Firm* — Eric J. Aagaard, Esq.; The Law Office of John A. Griecci

(57) ABSTRACT

An electric vehicle charging station having a console, a cable and a vehicle connector. The cable is connected with a break-away system that allows for a controlled structural failure of one of the cable connections when the vehicle connector is pulled away from the console with a critical level of force. The break-away system could be a body positioned along the length of the cable, and could be a connection between the cable and either the console or the vehicle connector.

11 Claims, 15 Drawing Sheets

Related U.S. Application Data

(60) Provisional application No. 61/460,413, filed on Dec. 29, 2010, provisional application No. 61/397,984, filed on Jun. 18, 2010, provisional application No. 61/339,749, filed on Mar. 8, 2010.

(51) Int. Cl.
*H01R 13/635* (2006.01)
*H01R 13/627* (2006.01)

(56) References Cited

U.S. PATENT DOCUMENTS

| | | | |
|---|---|---|---|
| 3,924,922 A * | 12/1975 | DeCenzo | H01R 13/18 439/839 |
| 3,976,347 A * | 8/1976 | Cooke et al. | 439/132 |
| 4,721,355 A * | 1/1988 | Gould | 385/76 |
| 4,863,397 A * | 9/1989 | Hatch, Jr. | 439/475 |
| 4,998,892 A * | 3/1991 | Shiley | H01R 13/631 439/378 |
| 5,259,782 A * | 11/1993 | Giffin | H01R 13/6392 439/314 |
| 5,346,406 A | 9/1994 | Hoffman et al. | |
| 5,365,973 A | 11/1994 | Fink, Jr. et al. | |
| 5,385,480 A | 1/1995 | Hoffman | |
| 5,427,542 A | 6/1995 | Gerow | |
| 5,702,264 A | 12/1997 | Endo et al. | |
| 6,042,432 A * | 3/2000 | Hashizawa et al. | 439/843 |
| 6,146,188 A | 11/2000 | Snyder | |
| 6,511,341 B1 * | 1/2003 | Finona | H01R 13/622 411/5 |
| 6,663,397 B1 * | 12/2003 | Lin | H01R 13/6277 439/154 |
| 2003/0054683 A1 * | 3/2003 | Bryan et al. | 439/181 |
| 2004/0002243 A1 | 1/2004 | Mellott et al. | |
| 2005/0081458 A1 | 4/2005 | McDonald | |
| 2005/0126349 A1 | 6/2005 | Trank et al. | |
| 2005/0130503 A1 | 6/2005 | Flemming et al. | |
| 2005/0284999 A1 | 12/2005 | Dent | |
| 2006/0068637 A1 | 3/2006 | Meleck et al. | |
| 2009/0215296 A1 | 8/2009 | Chambers | |
| 2009/0315296 A1 | 12/2009 | Berthold | |

FOREIGN PATENT DOCUMENTS

| | | |
|---|---|---|
| GB | 1590403 A1 | 6/1981 |
| WO | 2005060527 A2 | 7/2005 |
| WO | WO 2008/011241 A2 | 1/2008 |
| WO | WO 2008/057243 A2 | 5/2008 |

OTHER PUBLICATIONS

IP Australia, "Patent Examination Report No. 1" dated Aug. 25, 2014, for counterpart Australian Application No. 2011224868.

PCT "International Search Report and Written Opinion of the International Search Authority," dated May 5, 2011, of corresponding PCT application PCT/US 11/00433.

"Notification of First Office Action" including a Search Report, in counterpart Chinese Application No. CN 2011800231706, notification dated Sep. 19, 2014.

"Notification of Second Office Action" in counterpart Chinese Application No. CN 2011800231706, notification dated Jul. 17, 2015 (English translation only).

* cited by examiner

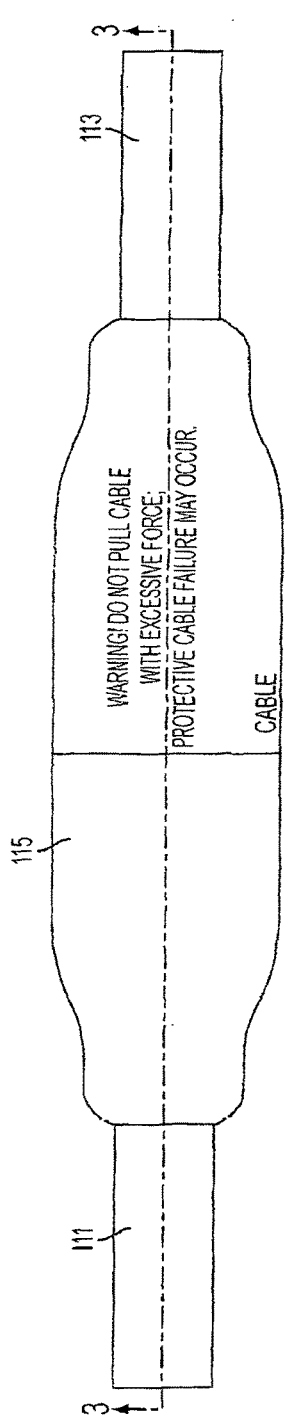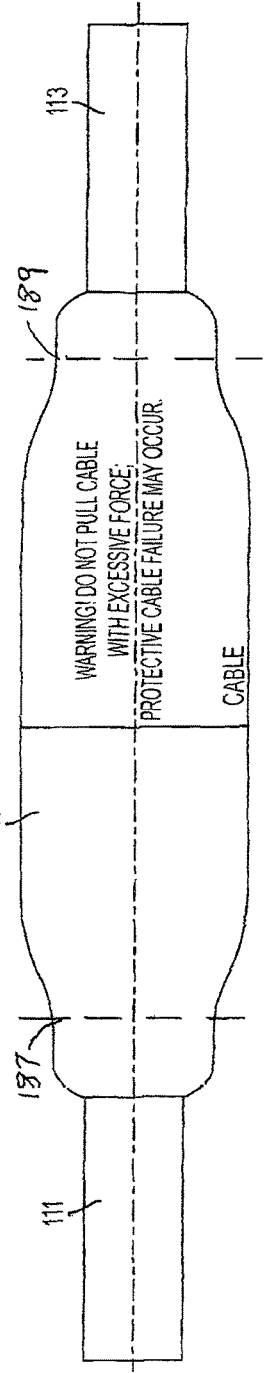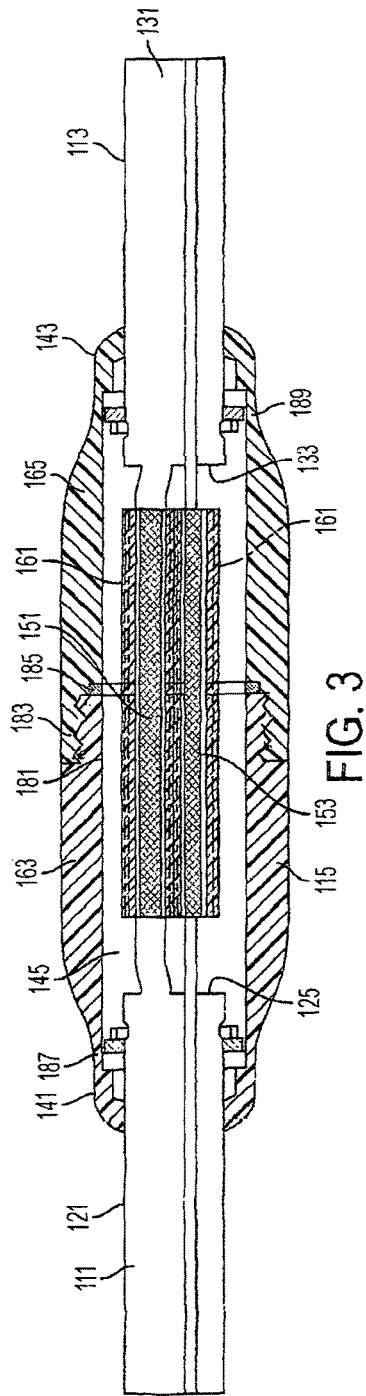

SHOULDER SCREWS
KEEP JAWS CAPTIVE

SLIDING JAWS

ANTI-TWIST
DIMPLE

BREAK-AWAY CABLE CONNECTOR

This application is a Continuation Application of PCT International Application No. PCT/US2011/000433, filed Mar. 8, 2011, which claims the benefit of U.S. provisional Application No. 61/339,749, filed Mar. 8, 2010, of U.S. provisional Application No. 61/397,984, filed Jun. 18, 2010, and of U.S. provisional Application No. 61/460,413, filed Dec. 29, 2010. Each of the aforementioned applications is incorporated herein by reference for all purposes.

The present invention relates generally to electric vehicle charging systems, and more particularly, to a charging station cable having a breakable connector configured to minimize the risk of exposing energized high-power components if the cable is subjected to potentially damaging levels of force.

BACKGROUND OF THE INVENTION

As effective electric vehicles are becoming more feasible and more desirable, there is an increased interest in home-based charging stations. To minimize charging times, it is desirable to use a high voltage (e.g., 240 volt) charging system. While using such systems there are both safety considerations and safety laws that need to be addressed to minimize the risk to homeowners and their property. Technologies addressing these considerations may also be useful to improve vehicle charging stations in industrial and commercial settings.

One significant concern is for the scenario when a charging station is disrupted while it is actively connected to and charging a vehicle. There are many ways this could happen in a home environment. For example, when a charging station cable extends across a gap from a charging station console to at vehicle, children or pets could run through the gap, yanking strongly on the cable causing damage to the system. Likewise, items in a garage could fall over and land on the cable. And of course, a driver could attempt to drive the vehicle away while it is still connected to the charging station.

In all these scenarios, the charging station cable is yanked in tension, potentially causing some part of the system to be broken. It is desirable for the system to be of a design that minimizes the risk of exposing energized (i.e., live) electrical wires to people, pets or flammable materials. Thus, it is desirable to minimize the likelihood that a high-force cable yanking event would either tear open the console unit of the charging station (where there are live wires) or expose live wires somewhere along the length of a charging station cable.

Accordingly, there has existed a need for a charging station configured with a failsafe structure that can cope with structurally damaging forces while minimizing the likelihood of exposing live electrical parts to people or flammable property. Preferred embodiments of the present invention satisfy these and other needs, and provide further related advantages.

SUMMARY OF THE INVENTION

In various embodiments, the present invention solves some or all of the needs mentioned above, providing a charging station configured with a failsafe structure that can cope with structurally damaging forces while minimizing the likelihood of exposing live electrical parts to people or flammable property.

The invention may be found in a break-away extension system (e.g., a break-away cable system) for electrically connecting a first plurality of electrical contacts that are electrically connected to an electric vehicle charging station console to a second plurality of contacts that are electrically connected to a vehicle connector configured to connect to an electric vehicle. The break-away cable is configured to mechanically fail at a critical load level. The cable includes a plurality of electrical wires extending the length of the cable, each wire being configured for connecting one respective contact of the first plurality of electrical contacts to one respective contact of the second plurality of electrical contacts.

The break-away cable system has two connected portions including a first portion and a second portion. The first portion mechanically connects to the console and the second portion mechanically connects to the vehicle connector. The two connected portions connect to one another with structure that will mechanically fail given a load at a critical load level. One of the two connected portions is connected to a break-away end of the cable. This provides a weak mechanical link at the break-away end of the cable, and protects the remaining parts of the cable (and items to which is connects) from being significantly damaged.

A plurality of longitudinally separable electrical connectors are affixed to an end of respective wires at the break-away end of the cable to provide the electrical connection to the wire's respective contact at that end of the cable. The two connected portions are configured to allow the plurality of longitudinally separable electrical connectors to detach and separate, and to allow the vehicle connector to spatially separate from the charging station console.

Advantageously, these features provide a failsafe structure in the form of a weak link that will likely separate before allowing other portions of the cable or the adjoining structure (i.e., the remainder of the charging system) to break, wherein those other structures could be damaged to the point of exposing energized conductors if the weak link did not separate first. Thus, the features provide a mechanism that can cope with structurally damaging forces while minimizing the likelihood of exposing live electrical parts to people or flammable property.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

BRIEF DESCRIPTION OF THE DRAWINGS

FIG. 2A is a lateral view of a break-away connector connecting two cable portions, as used in the charging station of FIG. 1, and FIG. 2B is that same break-away connector with indications of housing weak structural links at proximal and distal ends.

FIG. 3 is a cross-sectional lateral view of the break-away connector connecting two cable portions, as depicted in FIG. 2.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Typical embodiments of the invention are in the form of an electric vehicle charging station having a console and an extendable portion of some type (an extension system) extending out from the console. The extension system is configured to reach out from the console and electrically connect the console to a vehicle for charging. This extension system is provided with a weak structural link such that the extension system can break in a planned and safe manner when an excessive mechanical load is placed on the extension system. For the purposes of this application, a break-away extension system will be defined as an extension system that is provided with a weak structural link that will break when an excessive mechanical load is placed on the extension system.

The described embodiments of a break-away extension system fall into two basic types. In the first type, an in-line break-away extension system, two separate portions (extensions) are serially connected by a break-away connector that both electrically and mechanically connects the extensions to one another. One of the extensions is permanently connected to the console, and the other is a break-away extension that connects to the vehicle. In the second type of embodiment, a console-connected break-away extension system, a single breakaway extension has a break-away connector that is directly affixed to the console.

Figure 1:
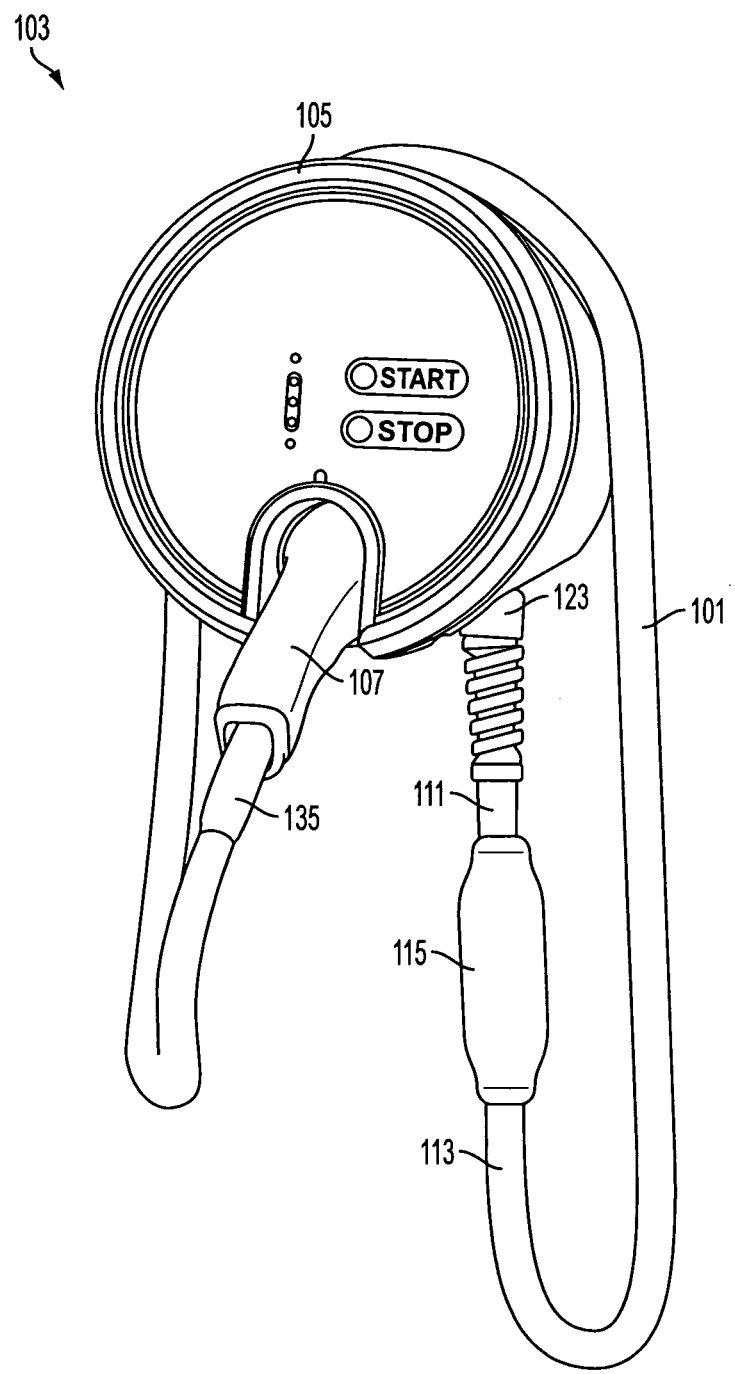
FIG. 1 is a perspective view of a first charging station embodying the present invention.
Figure 4:
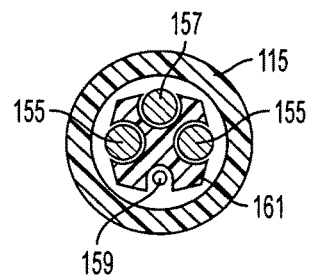
FIG. 4 is a cross-sectional longitudinal view of the break-away connector, as depicted in FIG. 2.

With reference to FIG. 1, first embodiment of the present invention resides in an in-line break-away extension system providing safety features for an electric vehicle charging station 103. The charging station includes a charging station console 105, a vehicle connector 107 that can be removably connected to an electric vehicle charging port (not shown), and the break-away extension system, which connects the charging station console to the vehicle connector. In this embodiment, the break-away extension system is in the form of a break-away cable system 101. In common usage the term console has many meanings. For the purpose of this application, the term console is defined to mean a base unit from which a vehicle connector extends on an extension system.

The charging station console has four (and more generally a plurality of) electrical contacts that are used for charging an electric vehicle. These console contacts include two power contacts, a ground contact, and a contact that carries a pilot signal (as are shown for a later embodiment). The pilot signal is used to control the application of 240 volt power to the power contacts. More particularly, power is not applied to the power contacts by a charging station control system unless the pilot signal indicates that the vehicle connector is safely connected to an electric vehicle, and that the break-away cable system is whole and in functioning condition.

The break-away cable system both physically and electrically connects the charging station console 105 to the vehicle connector 107, which is configured to mechanically lock to, and electrically connect to, a charging station connection port of an electric vehicle (not shown). Like the charging station console, the vehicle connector also includes four (and more generally a plurality of) contacts that correspond to the respective console contacts.

As will be described below, the cable system 101 includes four conductor pathways, e.g., four insulated wires, forming four independent electrical pathways from a proximal end of the cable system that is connected to the console, to a distal end of the cable system that is connected to the vehicle connector. Each wire electrically connects one electrical contact of the vehicle connector to its respective, equivalent contact of the charging station console.

It is anticipated that this embodiment of the charging station might be used in residential garages to charge personal vehicles (though commercial versions are within the scope of the invention). A 240 volt residential power system could provide for overnight vehicle charging. In such a setting, it is anticipated that less-than ideal conditions might exist. For example, a garage can be expected to be filled with objects that could interfere with easy access to the charging station. Moreover, the vehicle may end up parked in a position that places its charging port far from the charging station console. Additionally, while charging is taking place, pets, children and adults may want to pass between the charging station console and the charging port.

As was previously noted, in such a setting there are many possible situations in which the charging station cable system 101 could be physically abused. For example, while extending the cable to the vehicle, a user may yank or whip the cable system to get it passed an obstacle. Also, while the vehicle connector is attached to a vehicle, a person or object could inadvertently strike the cable system, placing it in high tension. It is also possible that a vehicle could be driven away while the vehicle connector is still attached to the vehicle.

The present embodiment provides a mechanical weak link in the cable system 101. The weak link is configured to fail in a way that limits risks to a user. More particularly, this weak link limits the risk that such events cause damage to the charging station console 105 and potentially expose users or flammable materials to a high-power electrical power source.

To that end, and with reference to FIGS. 1 to 4, the break-away cable system 101 includes first, proximal extension in the form of a first, proximal cable portion 111 attached to the charging station console 105, and a second, distal extension in the form of a second, distal cable portion 113 attached to the vehicle connector 107. The proximal cable portion 111 includes four (and more generality a plurality of) electrical wires encased in a single, flexible insulator that forms the main body 121 of the proximal cable portion. Each of these wires extends out both a proximal end 123 and a distal end 125 of the proximal cable portion main body with first an insulated portion (extending from the main body) and then an non-insulated portion (at the very ends of the electrical wires). A proximal end of each wire is configured for connection to (and is connected to) a respective contact of the charging station console.

The distal (break-away) cable portion 113 also includes four (and more generality a plurality of) electrical wires encased in a single, flexible insulator that forms the main body 131 of the distal cable portion. Each of these wires extends out both a proximal end 133 and a distal end 135 of the distal cable portion main body with first an insulated portion (extending from the main body) and then an exposed (non-insulated) portion (at the very ends of the electrical wires). A distal end of each wire is configured for connection to (and is connected to) a respective contact of the vehicle connector.

The proximal and distal cable portions electrically connect to one another (i.e., each of their wires electrically connects to a respective wire in the other cable portion), but are not configured to directly impart any significant mechanical load on one another. Instead, the proximal and distal cable portions mechanically connect to one another (i.e., impart mechanical loads on one another) indirectly via a break-away connector including a connector housing 115. The connector housing is designed to have a limited strength in tension, that tension strength being set at a level high enough to withstand normal usage (e.g., pulling the vehicle connector over to a vehicle charging port), but low enough to act as a mechanical fuse (i.e., a weak link), and thereby reduce the likelihood of damage to the charging station console if an extreme load (such as has been described above) is placed on the distal cable portion 113.

The connector housing 115 has a proximal end 141 affixed to the distal end 125 of the proximal cable portion main body 121, and a distal end 143 affixed to the proximal end 133 of the distal cable portion main body 131. The connector housing forms an enclosed cavity 145 that contains the exposed portions of the wires at the distal end of the proximal cable portion and at the proximal end of the distal cable portion. The connector housing structurally holds the distal end of the proximal cable portion main body in a rigid position and orientation with respect to the proximal end of the distal cable portion main body, so it carries mechanical loads between them.

One or more, and typically a plurality of, mated pairs of electrical wire connectors connect the respective pairs of wires from the two cable portions. As a result, the cable system 101 forms two power wires 155, one ground wire 157 and one pilot signal wire 159 separately extending throughout its length. Each mated pair of electrical wire connector portions has a male portion configured as a male connector, and a female portion configured as a female connector. The two portions longitudinally mate with one another to form a longitudinally severable electrical connection, i.e., one that is not affixed together in a way that prevents separation with the simple application of a gentle longitudinal force. For each respective pair of wires (one wire of the proximal cable portion and one wire of the distal cable portion), one of the wire connector portions is crimped to the exposed portion of one of the two wires, and its mating connector portion is crimped to the exposed portion of the other wire.

Three of the wire connectors are sliding connectors 151 that allow for a continued electrical connection over a limited longitudinal disconnecting distance of relative sliding movement between the two mated connector portions. This is the distance over which they must be separated to sever the electrical connection. Of the three, two are on the two power wires 155 and one is on the ground wire 157. The ground wire has the longest sliding connector (i.e., the largest disconnecting distance), which provides for the ground to separate last. While these three wire connectors have lengths allowing some separation of the wires to occur prior to breaking the electrical connection, the wire connector for the pilot signal wire 159 has a significantly shorter length (i.e., a shorter disconnecting distance), and typically will be a bullet connector 153 that snaps open under any significant tension (i.e., the disconnecting distance is negligibly small. As a result, the pilot signal will be broken immediately upon failure of the mechanical weak link, and well before the other wire connectors separate. The ground connection will be broken after the separation of all the other wires. In summation, the disconnecting distance of the ground wire is greater than the disconnecting distances of the power wires, and the disconnecting distances of the power wires are greater than the disconnecting distance of the signal wire.

The charging station control system is configured to detect the loss of the pilot signal wire connection and immediately de-energize the cable (i.e., disconnect the power from the cable). As a result, the power wires might not typically be energized when the power-wire wire connectors disconnect (unless the disconnection speed was too fast), reducing the possibility that arcing will occur. As a fail-safe for operating anomalies, the control system might be configured to periodically check for an apparent pilot signal disconnection to be an error, and to reconnect the power if the system is detectably operational. Alternatively or additionally, such a check could be run if a user called for it using controls on the console 105.

Thus, a distal end of each wire of the proximal cable portion is electrically connected to a first portion of one of the plurality of electrical wire connectors within the enclosed cavity 145, and a proximal end of the respective wire of the distal cable portion is electrically connected to a second portion of that electrical wire connector within the enclosed cavity. Additionally, the first and second portions of each electrical wire connector are removably mated within the enclosed cavity to form four separate conduction paths from the proximal end of the proximal cable portion to the distal end of the distal cable portion. The removable connectors are configured for a pilot signal wire to disconnect first and a ground wire to disconnect last.

Neither the connectors 151, 153 nor the non-insulated ends of the wires are individually insulated. To insulate the conduction paths from one another within the enclosed cavity 145, the connector housing 115 (within its enclosed cavity) contains an insulation block 161 that forms four individual insulated longitudinal passageways, each being adapted for one pair of mated wires and their respective connector. Typically the passageways are configured to conformingly receive a majority of the circumference of some or all of the wires (and their connectors) and thereby hold them laterally in place.

Thus, each electrical wire connector and its respective exposed wire portion are insulated from the other electrical wire connectors and their exposed wire portions by the insulation block. These insulated passageways do not provide a significant longitudinal grip on the wires or connectors, and thus the mated pairs of connectors can be freely pulled apart if not restrained by the connector housing 115 (via its grip on the main bodies of the proximal and distal cable portions).

The connector housing 115 is configured as two substantially rigid joined tubular portions, a proximal tubular portion 163 and a distal tubular portion 165. The proximal tubular portion includes the proximal end 141 of the connector housing, which is affixed around the distal end 125 of the proximal cable portion main body 121. Likewise, the distal tubular portion includes the distal end 143 of the connector housing, which is affixed around the proximal end 133 of the distal cable portion main body 131.

Figure 5:
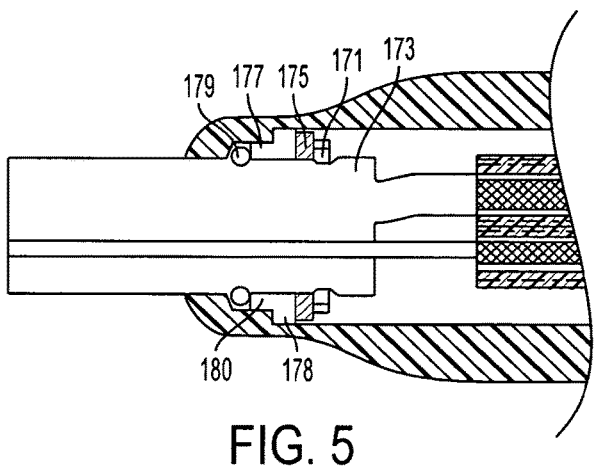
FIG. 5 is a cross-sectional lateral view of a connection between the break-away connector depicted in FIG. 2 and a cable portion as depicted in FIG. 2.

With reference to FIG. 5, each of the tubular portions is affixed to its respective cable portion main body using a similar form of connection (i.e., FIG. 5 can represent either connection). The connection includes a hose-type clamp 171 that is clamped onto the main body 173, and that has a plurality of tabs sticking out, a rigid (e.g., steel) washer 175 abutting the clamp, a lock ring 177 with a flange 178 and a cylindrical portion 180, and an o-ring 179. The flange is configured to pass tension loads from the clamp and washer to a conforming ridge on the tubular portion. The washer evenly distributes the force of the clamp (and the tabs) against the lock ring. The cylindrical portion of the lock ring is conformingly received in the end of the tubular portion, and is configured with a material and size appropriate for a squeeze fit with the tubular portion. The o-ring is longitudinally squeezed between the cylindrical portion of the lock ring and the tubular housing, one of which (the lock ring in this embodiment) is undercut so as to compress the o-ring into the main body of the cable portion.

Returning to FIG. 3, in the present embodiment, the proximal tubular portion 163 has an outer-threaded distal end 181, and the distal tubular portion 165 has an inner-threaded proximal end 183. These threaded ends are configured to threadedly mate with one another. The threaded ends are further configured to form an o-ring cavity to contain and compress an o-ring 185, and thereby (along with the other two o-rings) seal the enclosed cavity 145 from water and other contaminants.

The connector housing is configured with two weak structural links, at least one of which will break apart in tension if the vehicle connector is pulled away from the charging station console with a selected critical load level (or above). A proximal weak structural link 187 is in the proximal end 147 of the connector housing 115 (on the proximal tubular portion), and a distal weak structural link 189 is in the distal end 143 of the connector housing 115 (on the distal tubular portion).

More particularly, for all longitudinally load-bearing portions of each tubular portion, there is one tubular section (a break-away tubular section) having a lower overall cross-sectional area (e.g., a thinner tubular wall when viewed in a cross-section normal to the longitudinal direction) than any other load-bearing portion of the tubular section. The break-away tubular sections, which form the proximal and distal weak structural links, are adapted to break in tension at the critical load level. This load level is lower than that level necessary to break other portions of the connector housing, the connections between the connector housing and the cable portions, the connections between the break-away cable system and either the charging station console or the vehicle connector, and the mechanical, load bearing structures of the charging station console and the vehicle connector (with the possible exception of other fail-safe weak structural links, should they be added). The critical load level is higher than typical usage loads.

When the vehicle connector 107 is pulled away from the console 105 with the critical load level, one (or more) of the weak structural link(s) break, the electrical connectors become separated within the connector housing, and then one portion of each mated connector is pulled out of the connector housing by the wires at the broken end of the connector housing.

As was indicated above, the pilot wire connector is configured to break its electrical connection with any substantial longitudinal movement once a break-away tubular section is broken in tension. The two power wire connectors are configured to break their electrical connections with a lateral separation greater than that of the pilot wire, thereby allowing time for the control system to sense the broken pilot wire connection and attempt to disconnect the power from the power wires before their connectors separate (to prevent arcing). Moreover, if arcing does occur, it will likely occur while the wire connector portions are all still within the housing. Finally, the ground wire is configured to break its electrical connection with a lateral separation greater than that of the power wires, thus providing a ground until after the power wires are electrically disconnected. In sum, the cables are adapted to separate in the following order: first the pilot wire, then the power wires, and finally the ground wire.

Returning to FIG. 1, while the two cable portions could have various relative lengths, the proximal cable portion 111 will typically be significantly shorter than the distal cable portion 113. More particularly, the proximal cable portion is long enough such that the connector housing 115 clears (i.e., doesn't come into contact with) the charging station console when the vehicle connector is firmly pulled away from the charging station console, but is short enough that it does not reach the ground, and that it will not likely come into direct contact with other obstacles. This configuration, while potentially allowing the loss of more cable (compared to other configurations) in a break-away event, may lower the risk of the connector housing being damaged by striking other objects, as well as the risk of being broken in bending rather than in tension. This configuration is also well adapted to using the charging station console 105 to support the distal cable portion when the charging station is not in use (as depicted in FIG. 1).

As described, the break-away connector, and the distal cable may be considered to form the break-away extension system that is used with the proximal cable and the console. It mechanically and electrically connects to the console indirectly via the proximal cable. Nevertheless, it will be apparent that in this embodiment the proximal cable and the break-away connector may also be considered to be a break-away extension system under the invention. Indeed, with there being two separate weak links, the embodiment may be considered to have two separate break-away extension systems that share a single set of wire connectors.

Figure 6:
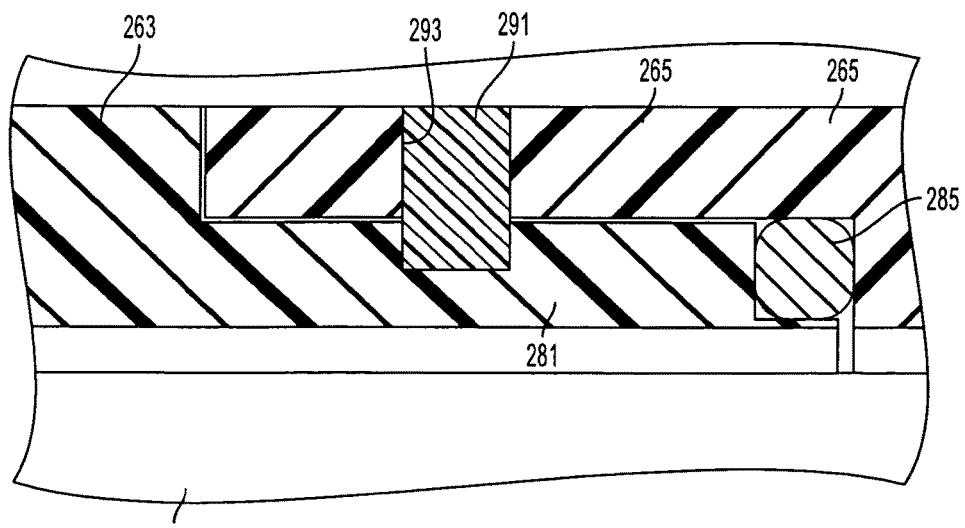
FIG. 6 is a cross-sectional lateral view of a connection between two portions of a break-away connector of a second charging station embodying the present invention.

With reference to FIGS. 1 and 6, a second embodiment of the invention includes parts similar to the first embodiment, and incorporates the first embodiment's configuration with the exception of the differences recited below. The connector housing again includes two tubular portions affixed to the ends of two cable portions. Nevertheless, in this embodiment, the connector housing 115 has one weak link at approximately the longitudinal center of the connector housing (rather than two weak links at opposite longitudinal ends).

More particularly, rather than having the threadedly connected tubular portions of the first embodiment, the second embodiment includes a proximal tubular portion 263 and a distal tubular portion 265 that are both provided with slidable cylindrical mating surfaces. The proximal tubular portion 263 has an outer slidable cylindrical mating surface at its distal end 281, and the distal tubular portion 265 has an inner slidable cylindrical mating surface it its proximal end 283. These ends are configured to slidably and conformingly mate with one another. They are further configured to form an o-ring cavity to contain and compress an o-ring 285, and thereby seal the connection between the two tubular portions from water and other contaminants.

Upon assembly, the tubular portions 263, 265 are affixed together by inserting one or more (and more typically two) shear pins 291 in blind holes 293 that extend laterally through one (the outer) mated tubular portion and part of the second (the inner) mated tubular portion. Thus, this embodiment includes a distal tubular portion slidably received concentrically by a proximal tubular portion, wherein the weak structural link is one or more shear pins laterally extending through bores. The shear pins are adapted to shear when the cable is in tension at the critical load level, which is lower than the load necessary to break the connector housing at any other location, the connections between the connector housing and the cable portions, the connection between the proximal cable and the charging station console, the connection between the distal cable and the vehicle connector and the structure of the charging station console and the vehicle connector (with the possible exception of other fail-safe weak structural links).

As was in the case of the prior embodiment, the wires are within an insulation block 161, and are adapted to separate in a predetermined order, with the pilot wire separating first, the power wires separating second, and the ground wire separating last. Typically the overlap between the slidable tubular mating surfaces are long enough to provide for all the wires to electrically separate prior to the two tubular portions becoming entirely unmated, i.e., all connections are broken before the wires become exposed.

Figure 7:
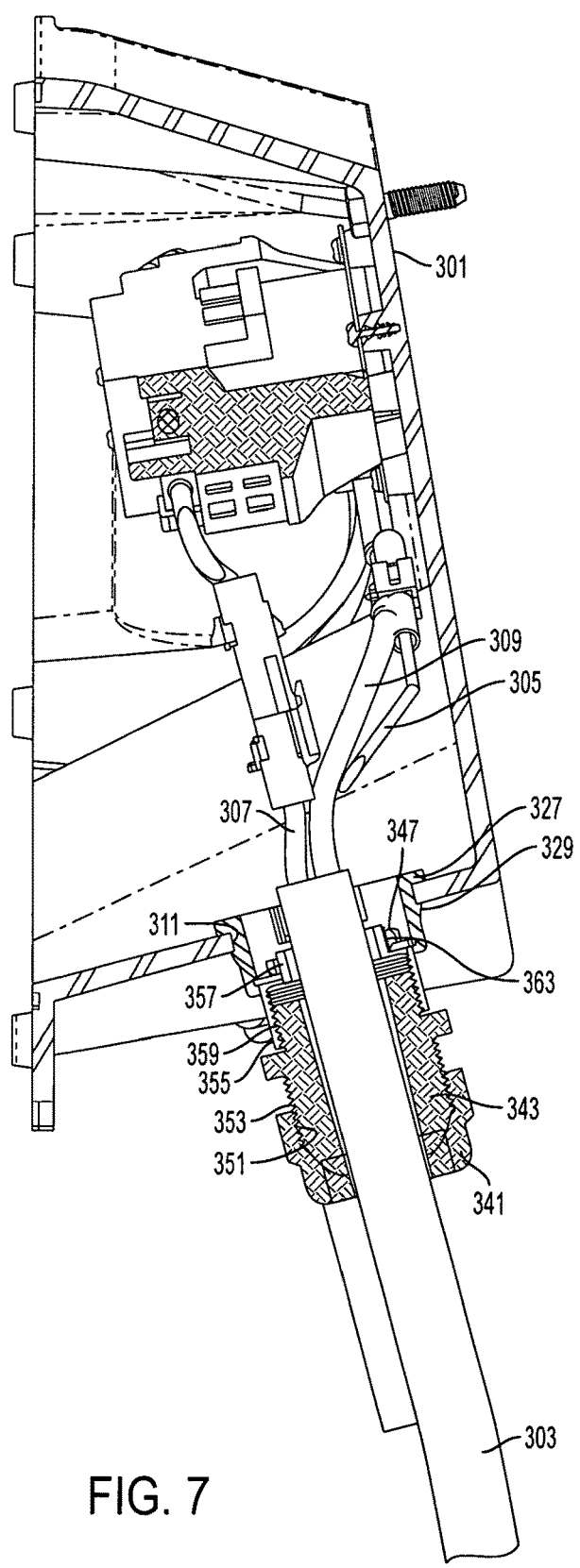
FIG. 7 is a cross-sectional side view of a charging station console, a break-away connector and a charging station cable of a third charging station embodying the present invention.
Figure 8:
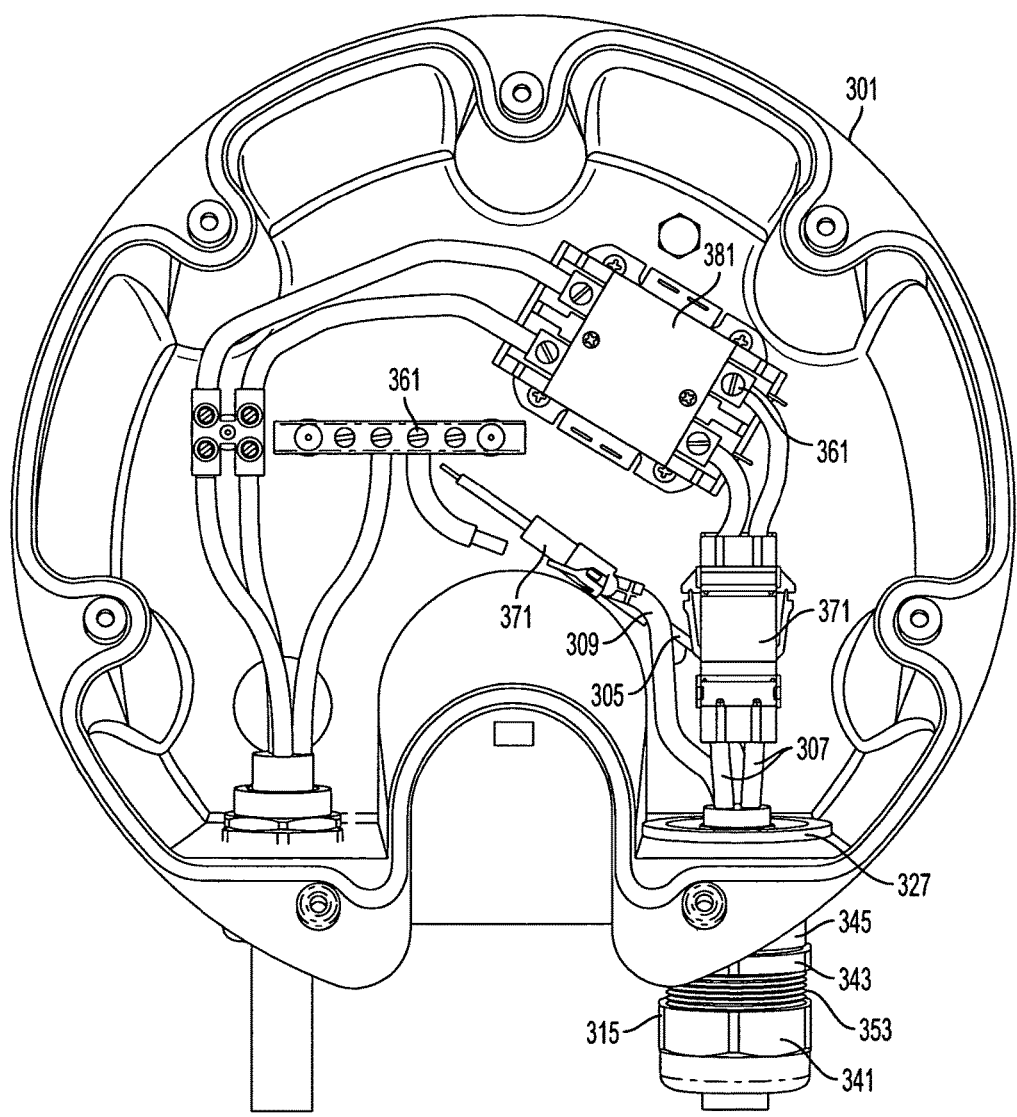
FIG. 8 is a front view of the charging station console with a cover removed, the break-away connector and the charging station cable, as depicted in the charging station of FIG. 7.
Figure 9:
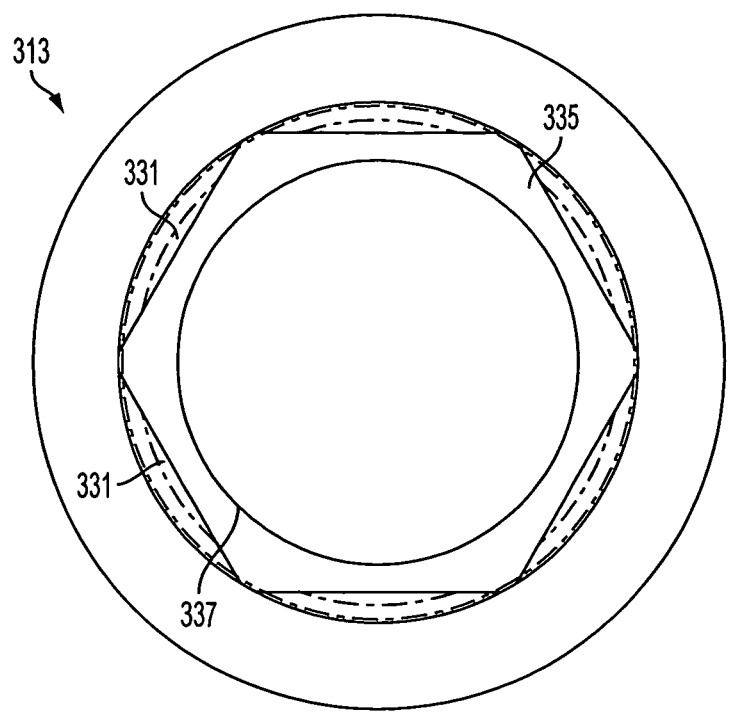
FIG. 9 is a top view of a break-away body, as used in the break-away connector of FIG. 7.

With reference to FIGS. 7 and 8, a third embodiment of the invention includes a similar charging station console 301 and vehicle connector (as previously depicted), but the break-away extension system has a substantially different break-away connector. Moreover, the breakaway connector connects directly to the console, making it the console-connected type of break-away extension system. As before, the break-away extension system is a break-away cable system includes a single length of cable 303 having four insulated conductors including a pilot signal wire 305, two power wires 307, and a ground wire 309.

As with the earlier embodiments, the break-away connector breaks at a critical load level, but in this embodiment it breaks in bending (i.e., due to a critical bending load level) rather than in tension. Similar to the prior embodiments, the cable and its four conductors are mechanically and electrically attached to the vehicle connector, the mechanical connection being strong enough to support a tension or bending load at levels above those that would place the break-away connector at the critical load level.

The cable charging station console 301 forms a downward-facing circular orifice 311, to which the break-away connector is attached. The cable and break-away connector extend downward out of the console. As a result of this configuration, a vehicle driving away while still attached to the vehicle connector would yank the cable with a side load, applying both shear and bending loads to the break-away connector. The break-away connector is stronger in shear than in bending, and thus the console and break-away connector are configured for the break-away connector to break at a critical bending load level. Because the orifice points downward, the interior of an outdoor console is relatively safe from precipitation after a break-away event.

With reference to FIGS. 7 to 14, the break-away connector of the present embodiment includes a cup-shaped break-away body 313 and a cable end-piece 315. The break-away body connects to the circular orifice 311 oriented with its longitudinal direction downward, and the cable end-piece attaches concentrically to the break-away body to extend longitudinally downward. When the connection between the break-away body and the cable end-piece is given a critical mechanical torsion/side load (e.g., the cable is horizontally pulled away from the front of the console), the break-away body can separate into two parts, allowing the cable end-piece to separate from the charging station console 301.

The break-away body 313 includes a short, longitudinally extending tubular portion having a proximal end 321 and a distal end 323. This tubular portion is typically made of a plastic or a strong rubber. An outer surface 325 of the proximal end is contoured to conform to an inner surface of the charging station console circular orifice 311, and is adapted such that it can be forced through the orifice from the inside of the charging station console to lock into place (as shown in FIG. 7). The proximal end of the break-away body includes a first flange 327 that is strong enough to carry a torsion/side load greater than the critical torsion/side load level. The proximal end of the break-away body further includes a first lip 329 to slide through the console orifice and then lock the break-away body onto the console. Optionally, the tubular portion could be unitary with the structure that also forms the console.

The distal end 323 of the break-away body 313 tubular portion forms a series of six strong inner flanges 331 in a hexagonal arrangement, and a circular outer flange 333. The inner and outer flanges hold and retain a metal washer 335 between them. The washer is provided with a primary central hole 337 and a series of small holes 339 at its outer periphery. The break-away body tubular portion is formed around the washer, and the material of the tubular portion grips the small holes to better hold the washer in place. The outer flange 333 is the weakest of the flanges.

Sequentially from a distal end to a proximal end, the cable end-piece 315 includes a plastic headpiece 341, a plastic locking body 343, a metal housing 345, and a metal nut 347. Each of these pieces is generally cylindrical and concentrically arranged with respect to one another. The cable 303 passes through all four parts of the cable end-piece via a concentric passageway.

An inner threaded surface 351 of the headpiece 341 is threadedly received around a first outer threaded surface 353 of the locking body 343, compressing the locking body to lock onto the cable 303 and rigidly retain it within the cable end-piece 315. The housing 345 is a unitary body that includes a first cylindrical portion 355 and a second, smaller cylindrical portion 357. A second outer threaded surface 359 of the locking body is threadedly received within an inner threaded surface of the first cylindrical portion of the housing 345.

The second cylindrical portion 357 of the housing 345 extends through the primary hole 337 of the washer 335. An inner threaded surface of the nut 347 is threadedly received onto an outer threaded surface 363 around the second cylindrical portion 357 of the housing 345. The nut and the first cylindrical portion 355 of the housing 345 are both larger than the primary hole 337 of the washer. The nut is screwed on to the second cylindrical portion of the housing to tightly retain the washer between the nut and the first cylindrical portion of the housing. For installation convenience, the six inner flanges 331 are sized and arranged to form a hexagon configured to conformingly hold and retain the nut for installation.

As a result, the cable end-piece 315 rigidly holds the cable 303 with respect to the washer 335 of the break-away body 313, and thereby with respect to the charging station console 311. The outer flange 333 of the break-away body 313 forms a weakest mechanical link for holding the cable 303 to the charging station console 311. When the cable is horizontally loaded at a level at or above the critical bending/side load level, the outer flange 333 of the break-away body flexes and/or breaks enough to release the washer 335, which twists out from the break-away body tubular portion. Thus, the washer, the cable end-piece and the cable are allowed to be pulled away from the charging station console.

The wires of the cable are each connected to contacts 361 within an enclosed cavity within the charging station console by electrical connectors 371 that may be longitudinally pulled apart. As was in the case with the prior embodiments, the wires, contacts and connectors are typically configured so that no exposed electrical wiring will pass from the enclosed cavity (in this case through the orifice 311) until after all the contacts are pulled apart. The wires are adapted to separate in a predetermined order, with the pilot wire connector separating immediately (and first), the power wire connectors separating second, and the ground wire connector separating last. A control system 381 cuts the power to the power wires when the pilot signal is lost.

Figure 10:
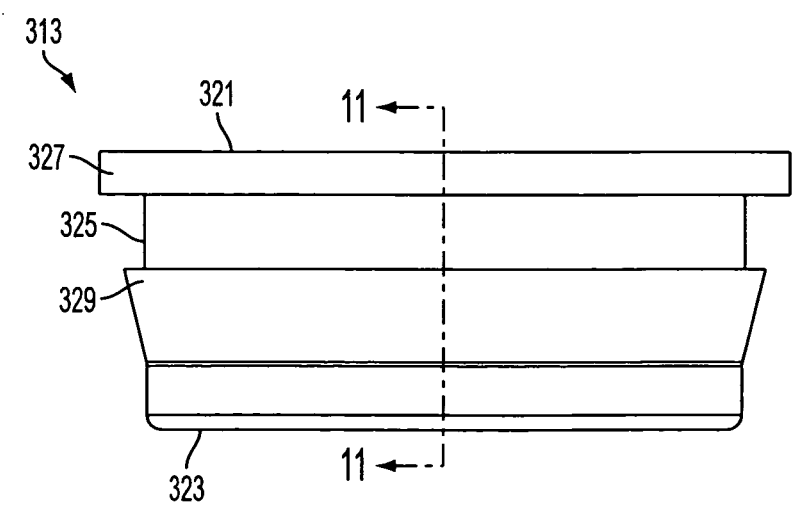
FIG. 10 is a front view of the break-away body depicted in FIG. 9.
Figure 11:
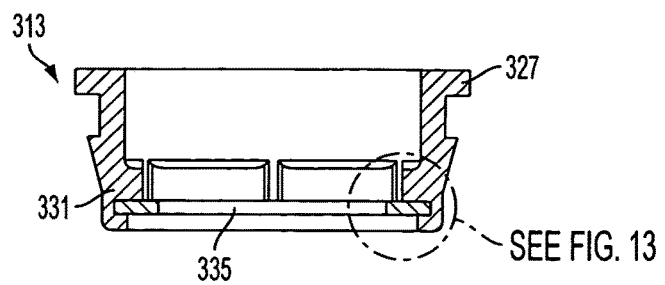
FIG. 11 is a cross-sectional front view of the break-away body depicted in FIG. 9.
Figure 12:
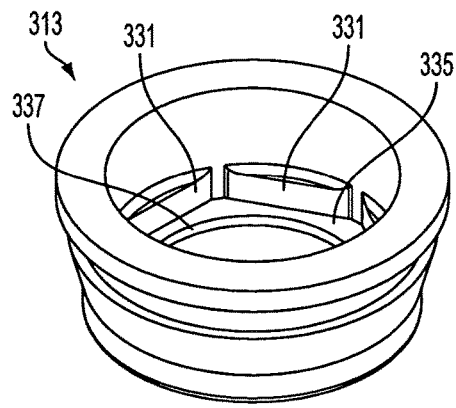
FIG. 12 is a perspective view of the break-away body depicted in FIG. 9.
Figure 13:
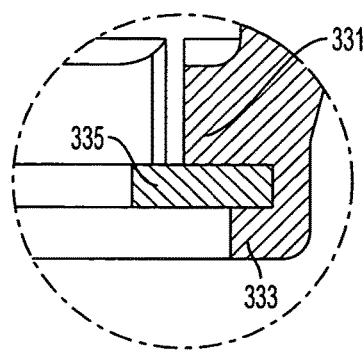
FIG. 13 is a cross-sectional front view of a portion of the break-away body depicted in FIG. 11.
Figure 14:
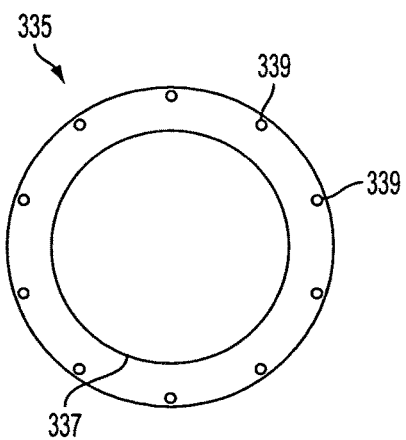
FIG. 14 is a top view of a washer as incorporated in the break-away body depicted in FIG. 9.
Figure 15:
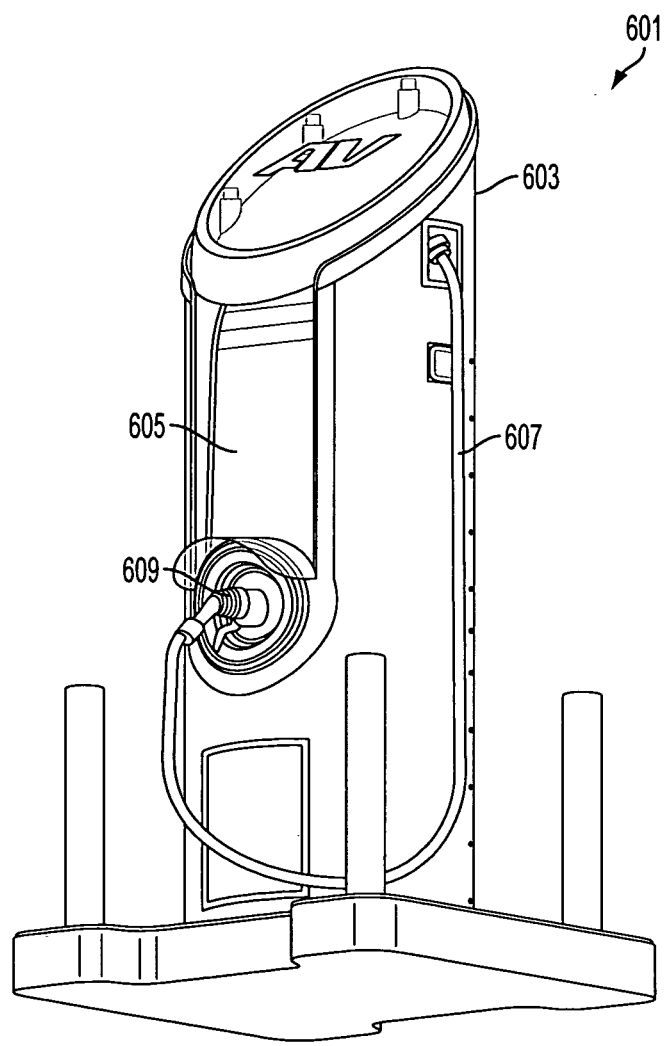
FIG. 15 is a perspective view of a fourth embodiment of a charging station under the invention.
Figure 16:
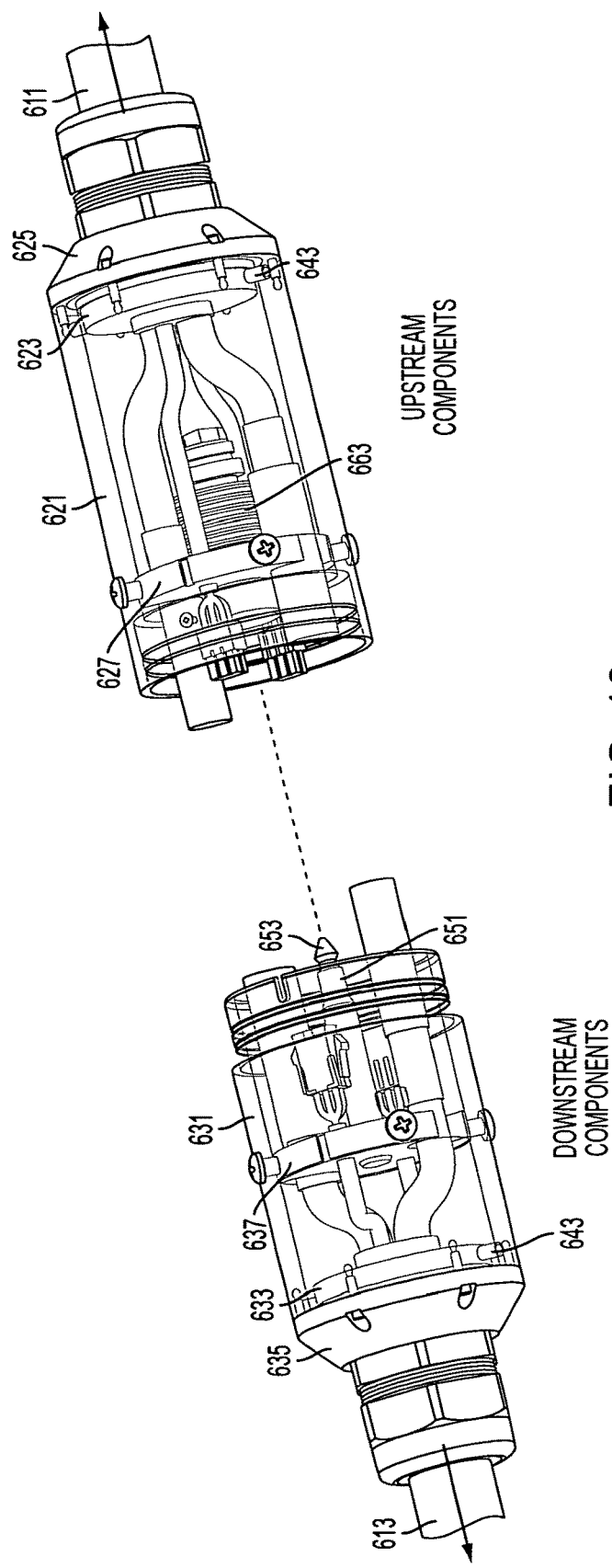
FIG. 16 is an exploded, perspective, cross-sectional view of an in-line break-away connector on a power cable of the charging station depicted in FIG. 15.
Figure 17:
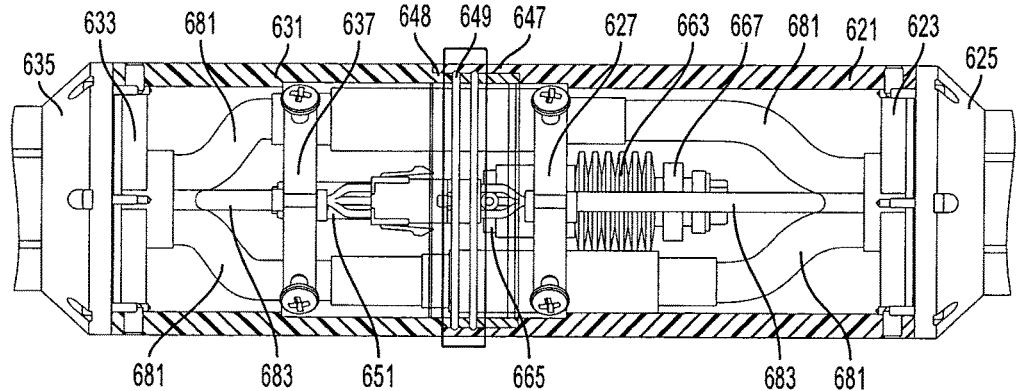
FIG. 17 is a cross-sectional view of the in-line break-away connector depicted in FIG. 16.
Figure 18:
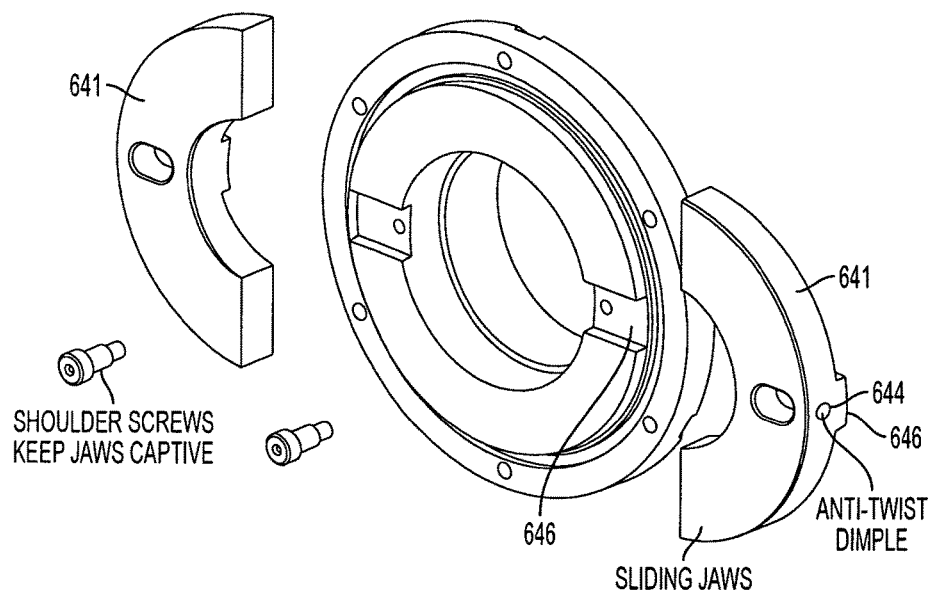
FIG. 18 is an exploded perspective view of a cable clamp used in the in-line break-away connector depicted in FIG. 16.
Figure 19:
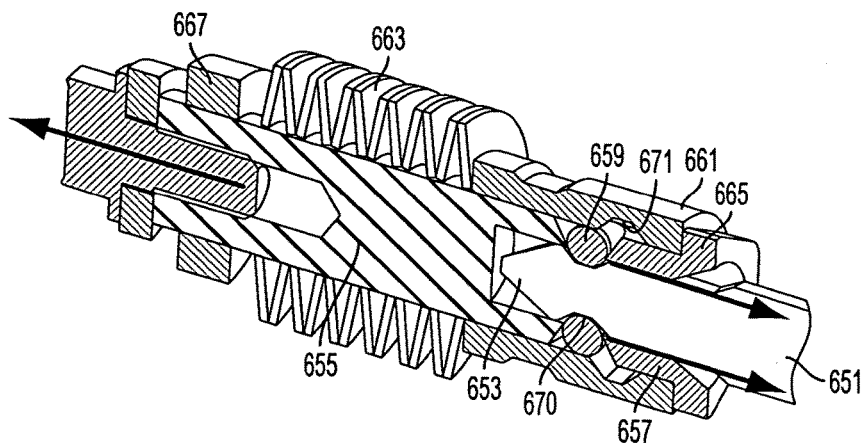
FIG. 19 is a perspective cross-sectional view of a ball detent mechanism used in the in-line break-away connector depicted in FIG. 16.
Figure 20:
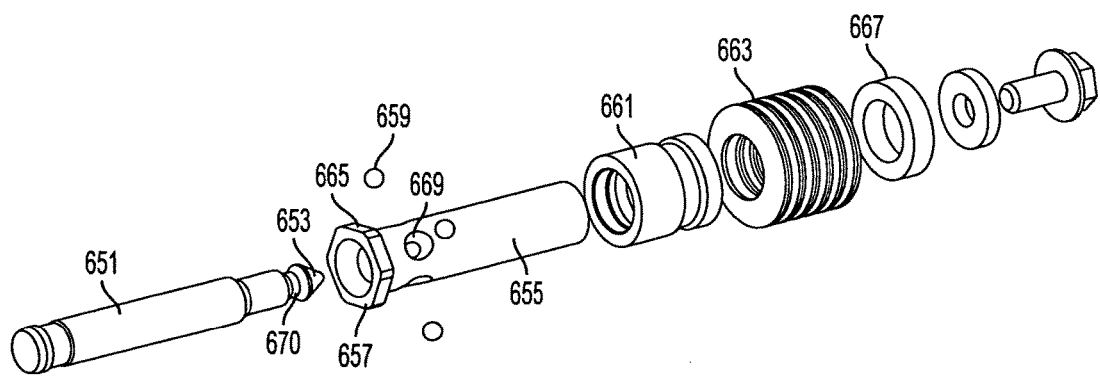
FIG. 20 is an exploded perspective view of the ball detent mechanism depicted in FIG. 19.

In a variation of the third embodiment of the invention, the same charging station console and vehicle connector are used, but the embodiment has a similar break-away body that fails via a different failure mechanism. With reference to FIG. 10, the break-away body 313 of this variation varies from the original embodiment in that the first flange 327 is not strong enough to carry a torsion/side load greater than the critical torsion/side load level. Instead, it is effectively the weakest of the flanges, and sized and configured to break away at the critical torsion/side load level. The outer flange 333 is strong enough to carry a torsion/side load greater than the critical torsion/side load level. Optionally, the first flange may be malleable such that it breaks (i.e., fails) by flexing rather than by separating into pieces.

As a result, when the connection between the break-away body and the cable end-piece is given a critical mechanical torsion/side load (e.g., the cable is horizontally pulled away from the front of the console), the break-away body will either flexibly deform to separate from the charging station console, or separate (break) into two parts, allowing the cable end-piece to separate from the charging station console.

The first flange 327 of the break-away body 313 therefore forms a weakest mechanical link for holding the cable to the charging station console. When the cable is horizontally loaded at a level at or above the critical torsion/side load level, a base of the first flange 327 of the break-away body flexes and/or separates enough to release the console. Thus, the flange forms a first connector having a base that is structurally attached to a second connector, in the form of the remainder of the break-away body. The base of the flange is configured to mechanically fail given a load at the critical load level between the first connector and the second connector.

With reference to FIGS. 15-18, a fourth embodiment of the invention is similar to the first embodiment of the invention, but differs in certain aspects (all other details being similar). These changes might suit a commercial environment, such as a high-speed, high-power commercial charging station 601. Similar to a typical gas pump at a commercial gas station, this commercial charging station might be configured as a free-standing console 603 having a panel 605 for controlling the charging station, a break-away extension system in the form of a break-away cable system 607 (the break-away connector not being shown in FIG. 15), and a vehicle connector 609 configured to connect to an electric automobile.

This commercial charging station 601 will likely operate at much higher power levels than home charging stations, providing for faster charging. Moreover, while a home station might support one or two cars, and operate once or twice a night, the commercial charging station might be in continuous operation throughout the day, rapidly charging a numerous succession of cars. Thus, the components of the commercial charging station must be robust enough to safely handle frequent switching from car to car, and to deal with the higher likelihood that a customer will drive away without disconnecting the nozzle 609 from the car.

As in the first embodiment, the charging station console 603 has a plurality of electrical contacts (not shown for this embodiment) that are used for charging an electric vehicle. In this embodiment, these contacts include two power contacts and a plurality (e.g., 12) signal connectors configured to carry various signals between the console and the vehicle being charged. At least one of these signal connectors could be configured primarily as a pilot signal, or the system could be configured to use any or all of the signal connections primarily for other purposes, and secondarily as a pilot signal (the loss of which would indicate a broken connection). Like the charging station console, the vehicle connector 609 also includes a plurality of contacts (not shown for this embodiment). As before, power is not applied to the power contacts by the charging station control system unless the pilot signal indicates that the vehicle connector is safely connected to an electric vehicle and that the cable is whole (i.e., there has been no break-away occurrence) and in functioning condition.

Also like the first embodiment, the break-away power cable 607 has an in-line device configured to break such that the cable controllably separates into a proximal cable portion 611 that connects to the console 603, and a distal cable portion 613 that connects to the vehicle connector 609 at a given critical level of force. Each portion of the power cable 607 includes a plurality of (e.g., 14) conductor pathways, forming independent electrical pathways from a proximal end of the cable connected to the console to a distal end of the cable connected to the vehicle connector. Each wire electrically connects one electrical contact of the vehicle connector to its respective, equivalent contact of the charging station console.

As in the first embodiment, the present embodiment provides a mechanical weak link along the cable system 607 in the form of a break-away connector having a connector housing. The weak link is configured to fail such that it limits the risk that a mechanical cable failure event causes damage to the charging station console 603 and potentially exposes users or flammable materials to a high-power power source.

The connector housing includes an proximal housing portion including an proximal tubular portion 621 affixed to an proximal cable clamp 623 and an proximal end plate 625, and an proximal mounting plate 627 affixed to the proximal tubular portion. The connector housing further includes a distal housing portion including a distal tubular portion 631 affixed to a distal cable clamp 633 and a distal end plate 635, and a distal mounting plate 637 affixed to the distal tubular portion.

Each of the cable clamps 623, 633, is affixed to its respective cable portion 611, 613, using a similar form of connection. The connection includes two hose-type clamp portions 641 that are clamped onto the cable portion using two set screws 643 threadedly screwed through the respective tubular portion and against two respective anti-twist dimples 644 in the respective clamp portions. The clamp portions are slidably affixed to their respective end plate via shoulder screws 645 that restrain the clamp portions into maintaining a slidable tongue-and-groove feature 646 between the clamp portions and their end plate.

The proximal tubular portion 621 forms a round, outer, distal-end sleeve 647 configured to be conformingly received over a round, inner, proximal-end sleeve 648 formed by the distal tubular portion 631, with one or more O-rings 649 compressed between the sleeves in O-ring cavities to hermetically seal the connection. This connection is not specifically configured to be load bearing. Instead, the proximal and distal mounting plates 627, 637 are configured to detachably connect to one another such that they will carry loads between the proximal and distal cable portions 611, 613 up to, but not exceeding the critical force level, With reference to FIGS. 16, 17, 19 and 20, the proximal and distal mounting plates 627, 637 connect via a rotationally symmetric ball detent mechanism configured to carry loads up to the critical force level without separation. This ball detent mechanism includes a male pin 651 having a free end 653, a female pin 655 having a free end 657, one or more (e.g., four) balls 659, a slide 661 and a spring 663. The spring and slide are conformingly and slidably received around the female pin with the slide being closer to the female pin free end, and are retained in that location by two flanges. A first flange 665 of the two flanges directly blocks the slide from sliding off the free end of the female pin. A second flange 667 of the two flanges is directly blocks the spring from sliding further away from the free end of the female pin.

The slide 661 is configured to push the balls 659 through one or more holes 669 in the female pin when the slide abuts the first flange. In that configuration, the balls are forced into mating groves 670 of the male pin, thereby locking the male and female pins together. The force of the male pin 651 pulling away from the female pin 655 translates into an outward force on the balls 659, and at the critical load between the pins, the balls are forced outward into grooves 671 in the slide, thereby forcing the slide to slide along the female pin away from the female pin free end 657 (and first flange) and toward the spring 663, thereby compressing the spring against the second flange 667 The male pin is thereby freed from the female pin, allowing it to separate from the female pin. It should be noted that this breakaway mechanism design is tunable to different critical loads. More particularly, all of the parts except the spring can be manufactured to operate over a range of critical loads, and then tuned to a specific application by using a spring having a spring constant appropriate to the particular application. Moreover, by using a plurality of Belleville washers stacked to form the spring (as shown), the spring constant can be varied by varying the number of Belleville washers that are used or by varying their spring constants.

With reference to FIGS. 17 and 21-24 (and similar to the first embodiment), a plurality of mated connecting pairs of electrical wire connectors connects the respective pairs of wires from the two cable portions. As a result, the cable 607 forms two distinct power wires 681 and twelve distinct signal wires separately extending throughout its length. The signal wires are typically carried within one or more wire bundles 683. Each connector connecting a mated pair of wires between the two cable portions has a male end portion configured as a male connector, and a female end portion configured as a female connector. The two connector end portions mate with one another to form a slidably removable electrical connection. For each respective mated pair of wires (one wire on the proximal cable portion and one wire on the distal cable portion), one of the connector end portions is electrically and mechanically connected to an exposed portion of a first wire of the mated pair of wires, and its mating connector end portion is electrically and mechanically connected to an exposed portion of a second wire of the mated pair of wires.

Each connector end portion is mechanically connected to its respective (i.e., proximal or distal) mounting plate such that a separating movement of the mounting plates (i.e., a relative movement of one away from the other) causes the mated connectors to move apart. Sliding connectors 701 connect the respective connecting pairs of power wires to allow for a continued electrical connection over a limited longitudinal (i.e., disconnecting) distance of relative sliding movement between the two sliding connectors (i.e., between the separation of the mounting plates). The connectors for the signal wire bundles 633 are also affixed to their respective mounting plates, but have a significantly shorter connection length, and typically will be configured to snaps apart under any significant tension (i.e., from separation of the housing portions). As a result, any signal wire that is used as a pilot signal will be broken immediately upon failure of the mechanical weak link, and well before the power wires disconnect.

In slower-charging home systems, as was described above, simple long-lead connections may be relied upon to delay separation until the power is cut off. In high-power systems there may be a concern about temperature buildup and uniformity of connection between two leads in a long-lead connection. More particularly, movement within the tolerance gaps in the long-lead connection may provide a highly variable contact area, and therefore a highly variable current per amount of contact area. For standard (non-long-lead) connections, it is known to use a high-current band between a slidably connectable male and female connector. This band runs substantially the full length of the outer and inner connecting surfaces of the connecting portions, and is configured as a tubular spring that presses outward on the female connector at the band's longitudinal ends, and inward on the male connector at the band's longitudinal center. Such an arrangement fails to provide the delayed disconnection required for the present embodiment.

Figure 21:
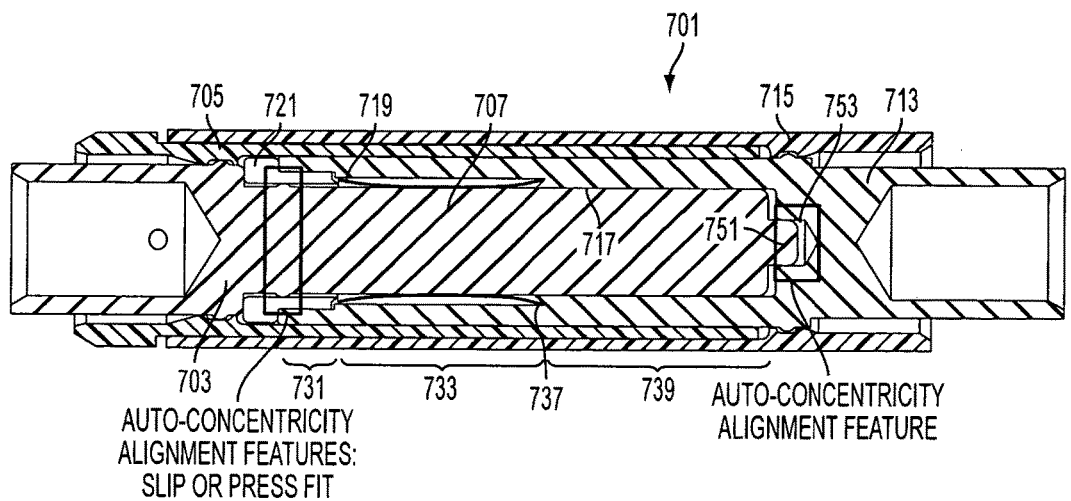
FIG. 21 is a cross-sectional view of an electrical connector used in the in-line break-away connector depicted in FIG. 18.
Figure 22:
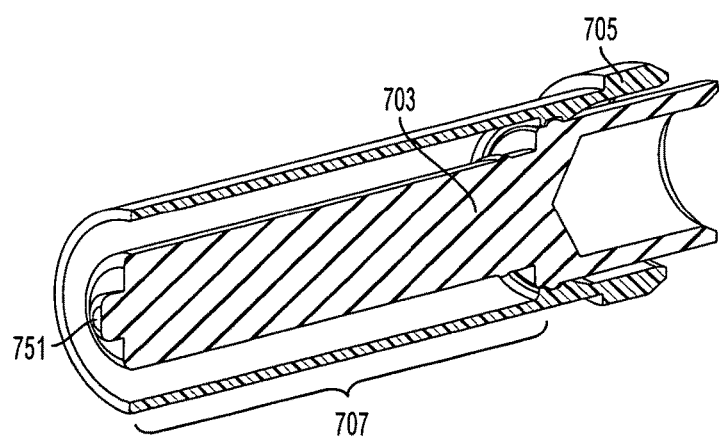
FIG. 22 is a cross-sectional view of a male end portion and surrounding cylindrical sleeve used in the electrical connector depicted in FIG. 21.
Figure 23:
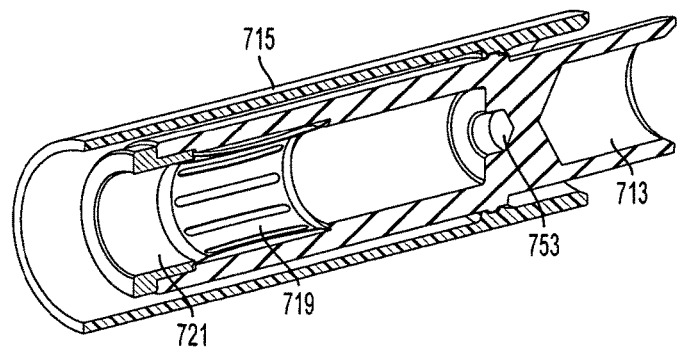
FIG. 23 is a cross-sectional view of a female end portion and surrounding cylindrical sleeve used in the electrical connector depicted in FIG. 21.
Figure 24:
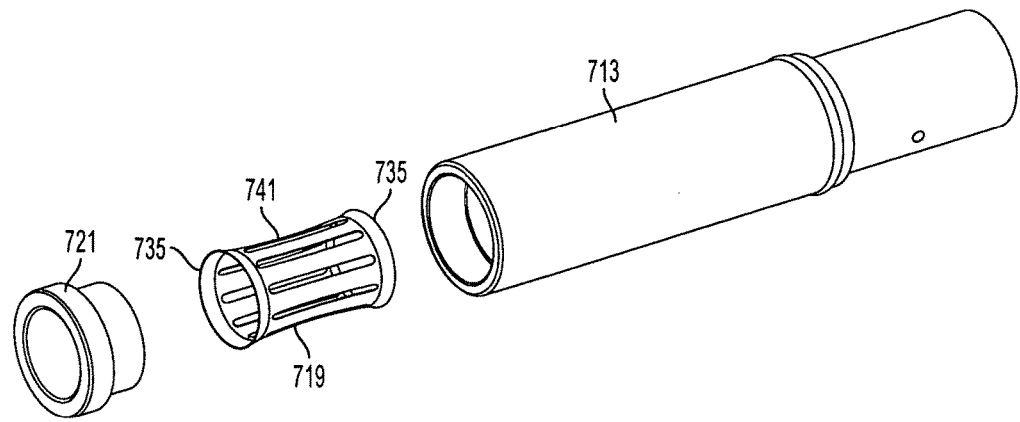
FIG. 24 is an exploded view of the female end portion depicted in FIG. 23.

To provide a long-lead connection for a high-power connection, the present embodiment high-power connector 701 includes a generally cylindrical conductive male end portion 703 snap fitted with a nonconductive, generally hollow and cylindrical male sleeve 705 surrounding much of the length of a mating shaft 707 the male end portion. The high-power connector 701 further includes a generally hollow and cylindrical conductive female end portion 713 snap fitted with a generally hollow and cylindrical nonconductive female sleeve 715 surrounding much or all the length of a mating bore 717 extending through the female end portion, and containing a conductive high-current band 719 retained within the bore of the female end portion by a slip- or press-fit nonconductive end-cap 721. As depicted in FIG. 21, when the male and female end portions are fully connected, the male end portion shaft is received within the bore of the female end portion. The female end portion is in turn received within the male sleeve, while the male sleeve is received within the female sleeve. In variations of the embodiment the sleeves might be optional.

The bore 717 of the conductive female end portion 713 includes a longitudinal outer end portion 731 configured to slip- or press-fit the nonconductive end-cap 721 to retain the high-current band within the bore 717. The proximal end of the shaft 707 may be provided with small protrusions that press-fit the end-cap 721 when fully mated, thus providing for that end to be held concentric. Inwardly adjoining the outer end portion 731 of the bore is an intermediate portion 733 having a diameter smaller than the outer end portion 731, and being sized to inwardly compress longitudinally outer ends 735 of the high-current band 719 when the male end portion 703 is received in the female end portion 713. An inward end of the intermediate portion 733 of the bore is characterized by a reduced diameter wall 737 configured to retain the high-current band 719 from traveling further in to the bore. Inwardly adjoining the intermediate portion 733 of the bore is an extended inner portion 739 of the bore that extends longitudinally a distance adequate to provide a desired prolonged connection via the high-current band while the connector is longitudinally disconnecting. As the depiction suggests, the longitudinal length of the extended inner portion 739 may be equal to (or significantly greater than) the longitudinal length of the intermediate portion 733.

The mating shaft 707 of the male end portion extends with a constant cylindrical diameter throughout the outer end portion 731, intermediate portion 733 and extended inner portion 739. The diameters of the mating shaft 707 and the extended inner portion 739 are sized such that they have a gap between them. This gap is adequately larger than the tolerances to which the respective surfaces are machined such that the inner end of the mating shaft might laterally move freely within the extended inner portion 739 if not otherwise restrained. Nevertheless, the diameter of the mating shaft 707 is large enough to contact the full circumference of an inner diameter of the high-current band 719 at a longitudinally central location 741 along the band (as depicted in FIG. 21).

The male end portion 703 and female end portion 713 are further configured with a conformingly mating shaft 751 and bore 753 at their respective inner (from the perspective of the female end portion) ends. This mated shaft and bore are typically smaller in diameter than the diameter of the mating shaft 707, and extend beyond the mating shaft (or in an alternative embodiment, within it). Moreover, the shaft 751 and bore 753 typically conform to each other with a much smaller intermediate gap, and are machined with tighter tolerances. As a result, the shaft 751 and bore 753, when mated (with the male end portion 703 fully inserted in the female end portion 713) restrain the inner end of the mating shaft from laterally moving into contact with the extended inner portion 739.

In a variation of this embodiment, the mating shaft 751 and bore 753 are sized and configured to simply be the end of the mating shaft 707 and the end of the bore 717 of the female end portion. In other words, the end of the shaft 707 and the end of the bore 717 are conformingly machined to a tight tolerance fit that is smaller than the majority of the bore 717 such that they restrain the majority of the bore from electrically contacting the shaft 707 other than via the high-current band.

Figure 25:
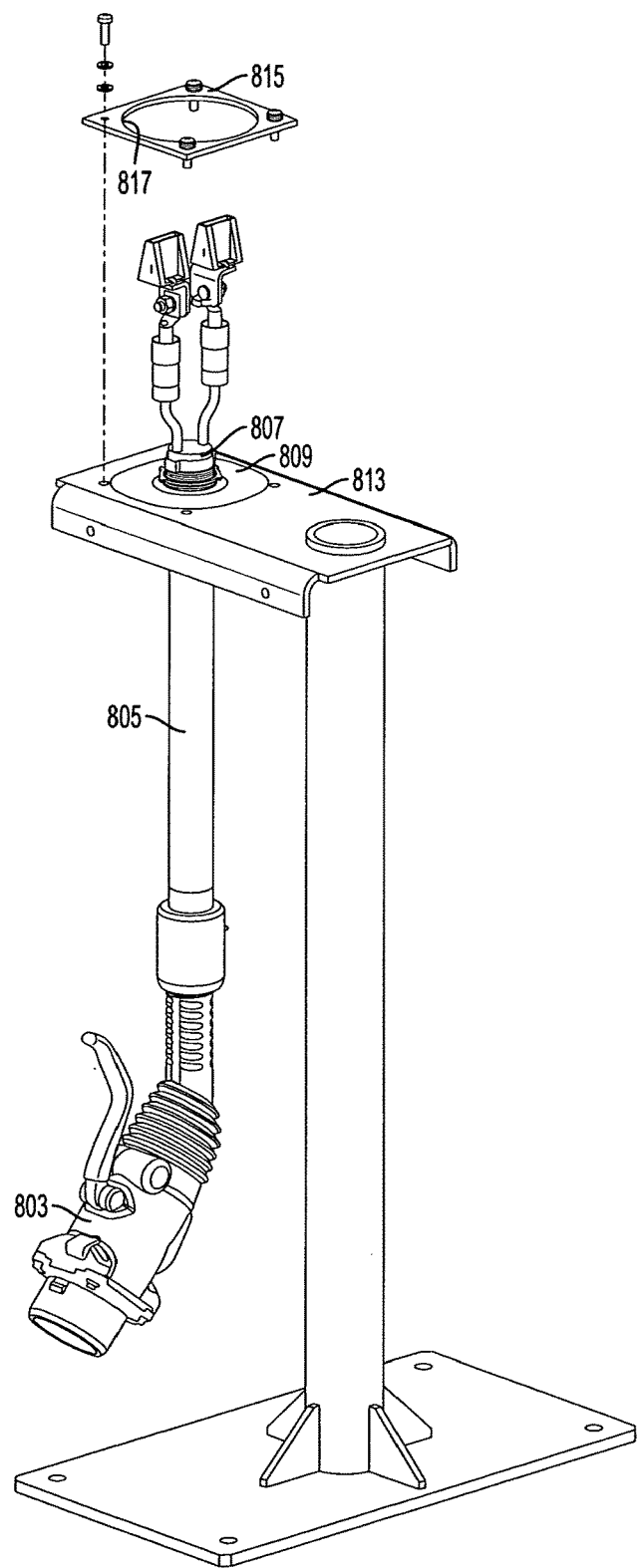
FIG. 25 is a perspective view of a portion of a fifth embodiment of a charging station, including a lower surface of a console, and a break-away connector.
Figure 26:
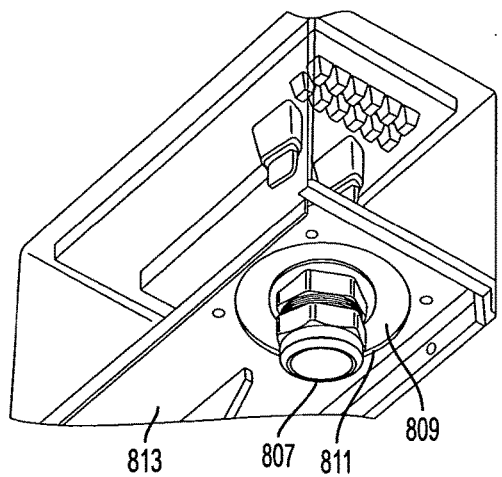
FIG. 26 is a partial, upwardly looking perspective view of the console and break-away connector depicted in FIG. 25.

With reference to FIGS. 25 and 26, a fifth embodiment of the invention is a charging station functionally similar to the third embodiment of the invention, but differing in the ways described below (all other details being similar). Like the third embodiment, this embodiment is provided with a console, a break-away extension system in the form of a console-connected break-away cable system, and a vehicle connector 803 configured to connect to an electric automobile. The console-connected break-away cable system includes a cable 805 and a break-away connector. The break-away connector includes a cable end-piece 807 and a circular break-away body 809. As with the third embodiment, the break-away connector breaks in bending at a critical bending load level.

This embodiment is envisioned as a high-speed, high-power commercial charging station (similar to the fourth embodiment rather than the third). Similar to the fourth embodiment, the cable 805 has a large number of conductors, including two high-power power wires, a ground wire, and a plurality of signal wires, one of more of which may be used as a pilot signal wire by a control system.

The cable charging station console forms a downward-facing circular orifice 811 in a surface 813 of the console, to which the break-away body 809 of the break-away connector is attached via a fastener plate 815 that is attached to the surface 813. The fastener plate is provided with a generally circular orifice 817 in the middle, which conforms to the size and position of the circular orifice 811 in the console surface 813 when the fastener plate is attached to the surface 813. As in the third embodiment, the cable and break-away connector extend downward out of the console, providing for the break-away connector to break in bending, and offering the console protection from precipitation after a break-away event.

The break-away connector cable end-piece 807 rigidly holds an end of a main body of the cable 805, and further holds the circular break-away body 809, which forms a sacrificial plate that extending radially outward from the cable end-piece. The cable end-piece extends through a hole in the center of the break-away body. The outer edges of the break-away body are sandwiched between the surface 813 of the console and the fastener plate 815. When the connection between the break-away body and the cable end-piece is given a critical mechanical torsion/side load (e.g., the cable is horizontally pulled away from the front of the console), the break-away body breaks and/or deforms, allowing the cable end-piece and the cable to separate from the charging station console.

Figure 27:
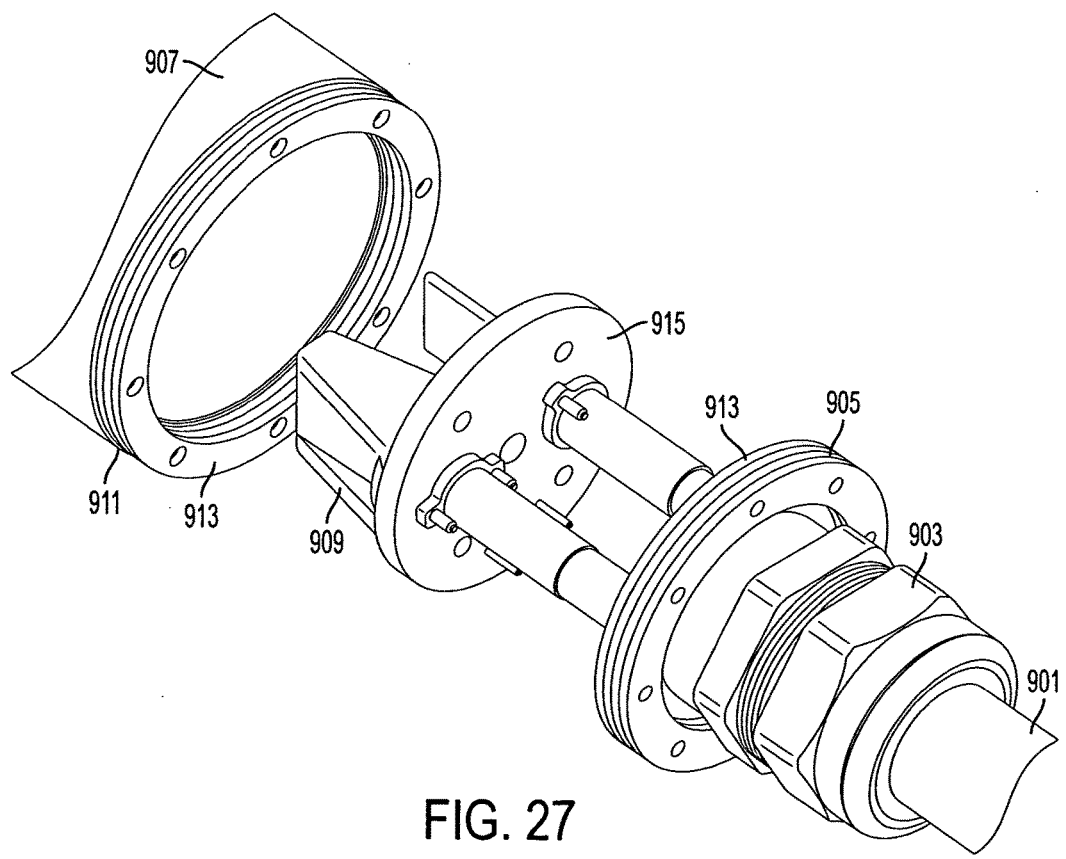
FIG. 27 is a exploded, perspective view of a portion of a break-away connector of a sixth embodiment of the invention.

With reference to FIG. 27, a sixth embodiment of the invention is a charging station functionally similar to the first embodiment of the invention, but differs in the ways described below (all other details being similar). Like the first embodiment, the embodiment is provided with a console, a break-away extension system in the form of an in-line break-away cable system, and a vehicle connector configured to connect to an electric automobile. The in-line break-away cable system includes a distal cable portion 901 and a break-away connector that attaches the distal cable to a proximal cable portion. The break-away connector includes a cable end-piece 903 and a plurality of break-away bodies 905, each being in the form of a washer-shaped membrane. As with the first embodiment, the break-away connector breaks in tension at a critical tension load level.

Similar to the first embodiment, the break-away connector forms a tube 907 containing connectors 909 connecting wires of the proximal and distal cable portions. At an end 911 of the tube there is a first stack of washer-shaped retention rings 913. Between each sequential pair of retention rings of the first stack is a radially outer portion of one of the membranes 905. The cable end-piece 903 includes a second stack of washer-shaped retention rings 913 that can fit radially inside the first stack of retention rings. Between each sequential pair of retention rings of the second stack is a radially inner portion of one of the membranes 905. Thus, the cable end-piece is held from being pulled longitudinally from the tube by the integrity of the membranes. The strength of this system is tunable by increasing the number of retention rings and membranes, or by varying the thickness of the membranes. Moreover, by using structure such as a support ring 915 rigidly affixed to the cable end-piece and conformingly received further within the tube 907, torsion loads can be reacted without loading the membranes.

For at least these last two embodiments (and possibly others), the break-away part (e.g., the membrane in embodiment 6) can be composed of a variety of materials. Some considerations that might be useful in selecting the material are that the material might preferably be strong, stiff (high Young's Modulus), and brittle. Metglas is an example of such a material. It also might be preferable that the material not degrade due to prolonged exposure to UV, and that it match coefficient of thermal expansion of nearby structure to prevent stresses during temperature changes.

It is to be understood that the invention comprises apparatus and methods for designing and for producing a related break-away cable connector, as well as the apparatus and methods of the break-away cable connector itself. Alternate variations of these embodiments could comprise other types of mechanical fuses and other orientations of the break-away cable element. For example, while the third embodiment had the connected portions and weak link directly affixed to the console, the configuration could be altered such that the connected portions and weak link are directly affixed to the vehicle connector, i.e., a vehicle-connector-connected break-away connector (e.g., a break-away connector that rigidly connects a cable end to a vehicle connector). Also, other combinations may be used, such as a single cable with a torsional weak link directly affixed to the console and a tension weak link affixed to the vehicle connector. In short, the above disclosed features can be combined in a wide variety of configurations within the anticipated scope of the invention.

While particular forms of the invention have been illustrated and described, it will be apparent that various modifications can be made without departing from the spirit and scope of the invention. For example, while the described extensions were cables, rigid arms might also be used within the scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A break-away extension system for electrically connecting a first plurality of electrical contacts that are electrically connected to an electric vehicle charging station console to a second plurality of contacts that are electrically connected to a vehicle connector configured to connect to an electric vehicle, the break-away extension system being configured to mechanically fail at a critical load level, comprising:

a first extension including a plurality of electrical wires extending through the first extension, each wire being configured for connecting one respective contact of the first plurality of electrical contacts to one respective contact of the second plurality of electrical contacts;

a second extension including a plurality of electrical wires extending through the second extension, each wire being configured for connecting one respective contact of the first plurality of electrical contacts to one respective contact of the second plurality of electrical contacts;

a break-away connector having at least one unitary tubular portion, the break-away connector being configured to structurally break in tension by having the at least one unitary tubular portion break into a plurality of pieces at the critical load, wherein the break-away connector structurally connects the first extension to the second extension; and one or more longitudinally separable electrical connectors electrically connecting the plurality of wires of the first extension to the plurality of wires of the second extension;

wherein the one or more separable electrical connectors are configured to detach upon the structural breaking of the break-away connector, said detachment electrically disconnecting the plurality of wires of the first extension to the plurality of wires of the second extension;

wherein the break-away connector includes a housing that defines a cavity; and wherein an end of each wire of the first extension, an end of each wire of the second extension, and each longitudinally separable electrical connector of the one or more longitudinally separable electrical connectors is contained within the housing cavity.

2. The break-away extension system of claim 1, wherein the break-away connector is configured to structurally break at the critical load by way of a structural failure of the housing at a proximal end of the housing, and wherein the break-away connector is further configured to structurally break at the critical load by way of a structural failure of the housing at a distal end of the housing.

3. The break-away extension system of claim 1, wherein the first extension is a cable.

4. The break-away extension system of claim 1, wherein:
the wires include a signal wire and a power wire; and
the wires and electrical connectors are configured such that, when the break-away connector fails due to the vehicle connector moving away from the console under the application of the critical load, the electrical connection of the signal wire is severed prior to the electrical connection of the power wire.

5. The break-away extension system of claim 4, wherein:
the electrical connector of the signal wire has a signal wire first portion and a signal wire second portion that are longitudinally separable from one another, and the signal wire first and second portions define a signal wire disconnecting distance over which they must be separated to sever the signal wire electrical connection;
the electrical connector of the power wire has a power wire first portion and a power wire second portion that are longitudinally separable from one another, and the power wire first and second portions define a power wire disconnecting distance over which they must be separated to sever the power wire electrical connection; and
the power wire disconnecting distance is greater than the signal wire disconnecting distance.

6. The break-away extension system of claim 5, wherein:
the wires further include a ground wire;
the electrical connector of the ground wire has a ground wire first portion and a ground wire second portion that are longitudinally separable from one another, and the ground wire first and second portions define a ground wire disconnecting distance over which they must be separated to sever the ground wire electrical connection; and
the ground wire disconnecting distance is greater than the power wire disconnecting distance.

7. An electric vehicle charging station configured to connect to and charge an electric vehicle, comprising:
a console providing a first plurality of electrical contacts that are electrically connected to a power source for charging the electric vehicle, the console having a control system being configured to energize and de-energize the first plurality of electrical contacts; and
the break-away extension system of claim 4, wherein the wires of the first extension are connected to the first plurality of electrical contacts;
wherein the control system is configured to de-energize the first plurality of electrical contacts when the electrical connection of the signal wire is severed.

8. An electric vehicle charging station configured to connect to and charge an electric vehicle, comprising:
a console providing a first plurality of electrical contacts that are electrically connected to a power source for charging the electric vehicle; and
the break-away extension system of claim 1, wherein the wires of the first extension are connected to the first plurality of electrical contacts.

9. The break-away extension system of claim 1, wherein one of the one or more longitudinally separable electrical connectors includes:
a conductive male end portion having a proximal end, a distal end, and a central portion extending therebetween;
a conductive female end portion forming a bore having a proximal end and an open distal end, wherein the bore defines a non-overlapping first longitudinal section and second longitudinal section, the second longitudinal section being farther from the distal end of the bore, wherein the second longitudinal section is at least as longitudinally long as the first longitudinal section, and wherein the distal end of the male end portion extends into the bore distal end and through both the first and second longitudinal sections of the bore; and
a conductive high-current band retained solely within the first section of the bore, the band being elastically compressed between the male end portion and the female end portion;
wherein the distal end of the male end portion and the proximal end of the female end portion form a conformingly mated shaft and bore that is smaller than the central portion of the male end portion; and
wherein the conformingly mated shaft and bore limits lateral movement of the distal end of the male end portion with respect to the female end portion, the conformingly mated shaft and bore having a tighter tolerance than the second longitudinal section.

10. The break-away cable of claim 9, wherein the conformingly mated shaft is on the distal end of the male end portion and conformingly mated bore is at the proximal end of the female end portion.

11. An electric vehicle charging station appendage for electrically connecting to a first plurality of electrical contacts that are electrically connected to an electric vehicle charging station console, comprising:
a vehicle connector configured to connect to an electric vehicle and having a second plurality of contacts; and
the break-away extension system of claim 1, wherein the plurality of wires are electrically connected to the second plurality of electrical contacts.

* * * * *